US005902673A

United States Patent [19]

Missell et al.

[11] Patent Number: 5,902,673

[45] Date of Patent: May 11, 1999

[54] WATERPROOF RECEIVER SHEET FOR TONER IMAGES

[75] Inventors: Gregory E. Missell, Penfield; Douglas E. Bugner, Rochester, both of N.Y.

[73] Assignee: Eastman Kodak Company, Rochester, N.Y.

[21] Appl. No.: 08/812,088

[22] Filed: Mar. 4, 1997

[51] Int. Cl.[6] ........ B32B 3/06

[52] U.S. Cl. ........ 428/307.3; 428/305.5; 428/315.5; 428/446; 428/411.1

[58] Field of Search ........ 428/307.3, 305.5, 428/315.5, 446, 411.1

[56] References Cited

U.S. PATENT DOCUMENTS

| | | | |
|---|---|---|---|
| 4,795,676 | 1/1989 | Maekawa et al. | 428/328 |
| 4,927,802 | 5/1990 | Leatherman | 503/214 |
| 5,055,371 | 10/1991 | Lee et al. | 430/126 |
| 5,302,439 | 4/1994 | Malhotra | 428/195 |
| 5,451,458 | 9/1995 | Malhotra | 428/412 |

FOREIGN PATENT DOCUMENTS

| | | |
|---|---|---|
| 1006958 | 1/1989 | Japan . |
| 1197763 | 8/1989 | Japan . |
| 3234588 | 10/1991 | Japan . |
| 4039089 | 2/1992 | Japan . |
| 5169864 | 7/1993 | Japan . |
| 6324509 | 11/1994 | Japan . |

*Primary Examiner*—Mark Chapman
*Attorney, Agent, or Firm*—John R. Everett

[57] ABSTRACT

A toner image receiver sheet for electrophotography comprises a substantially opaque substrate of microporous material and, disposed on at least one surface of the substrate, a substantially water-impervious toner image-receiving layer comprising a thermoplastic organic polymer. The microporous material of the substrate comprises a matrix of substantially water-insoluble organic polymer in which is distributed finely divided substantially water-insoluble filler particles that are at least 50 weight percent siliceous particles and constitute about 40 to 90 weight percent of the microporous material. A network of interconnecting pores communicating throughout the microporous material constitutes about 35 to 95 volume percent of the microporous material. On at least one surface of the substrate is disposed a substantially water-impervious toner image-receiving layer comprising a thermoplastic organic polymer. The toner image receiver sheet is substantially impervious to water and has a volume resistivity of about $1\times10^8$ ohm-cm to $1\times10^{13}$ ohm-cm, preferably about $1\times10^{10}$ ohm-cm to $1\times10^{12}$ ohm-cm. In a process for forming the just-described toner image receiver sheet, the toner image-receiving layer is preferably applied on at least one surface of the substrate using a water-dispersible composition of a thermoplastic organic polymer.

29 Claims, No Drawings

WATERPROOF RECEIVER SHEET FOR TONER IMAGES

FIELD OF THE INVENTION

This invention relates to receiver sheets for electrostatographic imaging processes such as electrophotography. More particularly, it relates to a novel water-impervious receiver sheet for toner images and to a process for forming such a receiver sheet.

BACKGROUND OF THE INVENTION

In a conventional electrostatographic copying process, a latent electrostatic image is formed on the insulating surface of a photoconductor element. If a dry development process is used, charged toner particles are applied to the electrostatic image, where they adhere in proportion to the electrostatic potential difference between the toner particles and the charges on the latent image. Toner particles that form the developed image are then transferred to a receiver sheet, where the transferred image is fixed, usually by a thermal fusion process in which the receiver sheet is passed between a pair of rollers under pressure and subjected to temperatures of about 200–300° F. (93–149° C.). It is conventional to transfer toner particles from the photoconductor element to the image receiver sheet by means of an electrostatic bias between the element and the receiver sheet.

While the conventional electrostatic transfer process works well with large toner particles, difficulties arise as the size of the toner particles is reduced. Smaller toner particles are necessary for images of high resolution and low granularity. As the particle size of the toner falls below about 8$\mu$, however, the surface forces holding the toner particles to the element tend to dominate over the electrostatic force that can be applied to the particles to assist their transfer to the receiver sheet. Thus, less toner transfers, and image quality suffers. In addition, as the particle size decreases, coulombic repulsion between the particles tends to scatter them, causing loss in image resolution and increase in graininess and mottle. Thus, high resolution images require very small particles, but it is difficult to obtain high resolution electrostatic transfer images without image defects.

To aid in transferring all of the toner particles from the element to the receiver, it is advantageous to coat the image-receiving surface of the sheet with a thermoplastic polymer. During transfer, the toner particles adhere to or become partially embedded in the thermoplastic coating and are thereby more completely removed from the photoconductor element. A further improvement in toner transfer may be obtained by coating the thermoplastic polymer layer on the receiver sheet with a release agent. However, if the binder resin for the photoconductor and the thermoplastic polymer layer of the receiver sheet are appropriately selected with respect to their compositions and surface energies, a release agent is not necessary.

Receiver sheets for electrophotographic toner images are most often paper, although plastic sheets have also been used. Both have disadvantages, especially for receiving fusible toner powder of small particle size in the making of continuous tone or half-tone electrophotographic reflection prints. To use a conventional transparent plastic sheet for this purpose, the plastic must be pigmented with, for example, titanium dioxide or the like in order to provide an opaque reflective support for the toner image. Blending a colorant with the polymer adds cost, and the pigmented sheet has a higher specific gravity. Furthermore, colorants tend to fade or otherwise change color with aging.

As for paper, its untreated surface is typically too rough to give high resolution transfer images. Consequently, a smooth surface must be produced, either by calendering or by applying a layer of plastic or clay to the paper, which adds cost. A particularly serious disadvantage of a paper receiver sheet is that, being fibrous and hydrophilic, it unavoidably contains moisture. When heated, as in the toner fusing step, the moisture in the paper vaporizes and causes buckling and blistering in the toned image, especially in large areas of toner. Furthermore, a paper receiver sheet upon exposure to water is prone to distortion, tearing, and other damage.

U.S. Pat. No. 4,795,676, the disclosure of which is incorporated herein by reference, describes an electrostatic recording material composed of a multi-layered synthetic paper support having an electroconductive layer and a dielectric layer formed successively thereon. The support has a base layer, with paper-like layers of thermoplastic resin on both sides, and surface layers of thermoplastic resin containing little if any inorganic fine powder.

U.S. Pat. No. 5,055,371, the disclosure of which is incorporated herein by reference, describes a receiver sheet for toner images that comprises a paper-like, substantially opaque microvoided polymeric sheet of a continuous matrix of oriented and heat set thermoplastic polymer in which is dispersed polymeric microbeads surrounded by void spaces. Bonded to at least one surface of the microvoided polymeric sheet is a layer of thermoplastic polymer whose glass transition temperature is below the melting temperature of the matrix polymer of the microvoided sheet.

JP 1197763 discloses a paper with more than 65 percent opacity that is suitable for use with a non-impact printer. The paper is characterized as having a coating agent composed of 80–40 weight percent of an acrylic urethane resin and 20–60 weight percent of a filler on the surface of a synthetic paper whose surface layer is a stretched polyolefin film that contains 20–65 weight percent of an inorganic fine powder.

JP 3234588 discloses an image receiving sheet for a thermal transfer printer that includes a base of monoaxial or biaxial drawn polyolefin film that has a resin-coated layer on its front and rear surfaces, with a color image receiving layer composed mainly of saturated polyester and crosslinking agent.

JP 6324509 discloses a toner receiving sheet for color electophotography containing a resin with a $T_g$ of −20° C. to +30° C. and spherical low molecular weight polyolefin with a softening point of 100° C. or more, the average particle diameter being 0.1–1.0 $\mu$m.

JP 1006958 discloses a static recording sheet comprising a substrate, preferably a synthetic paper, with an electroconductive layer and a dielectric layer disposed on at least one surface of the substrate.

JP 5169864 discloses an image receiving sheet for thermal printing comprising: a surface layer of a single-layered drawn porous film that has a void structure and contains a thermoplastic resin and an inorganic pigment as the main components; a back layer that also contains a thermoplastic resin and an inorganic pigment but is a multi-layered porous film; and an image receiving layer.

JP 4039089 discloses an image receiving paper for sublimation heat transfer having an intermediate layer formed of an addition-polymerizable composition and a polyolefin resin and an outer layer of a thermoplastic polyester resin provided in order on a highly smooth base material.

A need exists for an improved receiver sheet, especially for images containing large solid areas of toner. Such a sheet must meet several important criteria. First, it must be suitable for the fusion and fixing thereto of toner powders of small particle size to provide images of high resolution. The sheet must retain dimensional stability when heated during the transfer and fixing of toner to it. The sheet must be highly moisture-resistant to avoid problems caused by water vaporization during heating, and also to provide protection, if exposed to water, to tearing or other damage. In addition, there must be good adhesion between the thermoplastic surface layer and the substrate of the receiver sheet to avoid delamination when heated. Then, of course, as a support for electrophotographic prints, the sheet must be substantially opaque and highly reflective for visible light. For convenience in handling, the sheet should be flexible and of reasonably low specific gravity.

The present invention offers further improvement in the forming of images of high resolution, especially when the toner images have large solid areas of toner. Images of this kind include, in particular, continuous tone electrophotographic color prints, but also half-tone images in which dot spread occurs to create large solid toner areas, as well as largely alpha-numeric images that include solid areas such as graphics and corporate logos.

A problem with all such images, when paper is the receiver sheet substrate, is that the toner in the large solid areas will crack as a result of deformation of the paper caused by water absorption. When the paper dries out, it shrinks unevenly, relatively less in large toner areas. Variable dimensional changes across the receiver sheet surface would damage any continuous tone or half tone images having large toner areas. The paper may also curl or wrinkle. Ordinary plastic sheets, although not moisture-absorbent, also have drawbacks, as mentioned previously. All these problems are overcome by the toner image receiver sheet of the present invention.

SUMMARY OF THE INVENTION

In accordance with the invention, a toner image receiver sheet for electrophotography comprises a substantially opaque substrate of microporous material and, disposed on at least one surface of the substrate, a substantially water-impervious toner image-receiving layer comprising a thermoplastic organic polymer. The microporous material of the substrate comprises a matrix of substantially water-insoluble organic polymer, in which is distributed finely divided substantially water-insoluble filler particles that are at least 50 weight percent siliceous particles and constitute about 40 to 90 weight percent of the microporous material. A network of interconnecting pores communicating throughout the microporous material constitutes about 35 to 95 volume percent of the microporous material. On at least one surface of the substrate is disposed a substantially water-impervious toner image-receiving layer comprising a thermoplastic organic polymer. The toner image receiver sheet is substantially impervious to water and has a volume resistivity of about $1\times10^{8}$ ohm-cm to $1\times10^{13}$ ohm-cm, preferably about $1\times10^{10}$ ohm-cm to $1\times10^{12}$ ohm-cm.

Further in accordance with the invention is a process for forming the just-described toner image receiver sheet. The toner image-receiving layer on at least one surface of the substrate is preferably applied using a water-dispersible composition of a thermoplastic organic polymer.

In the toner image receiver sheet of the present invention, both the opaque synthetic paper substrate and the thermoplastic organic polymeric image-receiving layer disposed thereon are substantially impervious to water, which provides a great advantage in durability and image quality over previously known receiver materials, especially for the production of continuous tone color electophotographic images that exhibit high gloss in areas of minimum, intermediate, and maximum density.

DETAILED DESCRIPTION OF THE INVENTION

Many known microporous materials may be employed for the substrate of the toner image receiver sheet of the invention. Examples of such microporous materials, along with their properties and processes for making them, are described in, for example, U.S. Pat. Nos. 2,772,322; 3,351,495; 3,696,061; 3,862,030; and 4,927,802, the disclosures of which are incorporated herein by reference.

A wide range of polymers may be employed as the matrix of the microporous material; in general, any substantially water-insoluble polymer that can be extruded, pressed, or rolled into a film, sheet, strip, or web may be used. The polymers may be homopolymers, random copolymers, block copolymers, block copolymers, graft copolymers, atactic polymers, isotactic polymers, syndiotactic polymers, linear polymers, or branched polymers. Examples of suitable substantially water-insoluble polymer classes include polyolefins, polyhaloolefins, polyesters, polyamides, polyimides, polyurethanes, polyureas, polystyrenes, acrylic and methacrylic polymers, polycarbonates, polyethers, polysulfides, polysilanes, polysiloxanes, and hybrids and mixtures thereof Polyolefins, especially polyethylenes and polypropylenes, are preferred. Suitable polyethylenes include low molecular weight polyethylenes of low, medium, and high density, ultrahigh molecular weight polyethylene, and mixtures thereof.

Present in the microporous material of the receiver substrate, in an amount constituting about 40 to 90 weight percent of the microporous material, are finely divided, substantially water-insoluble filler particles, at least 50 weight percent of which are siliceous particles. Examples of suitable siliceous particulate materials include calcium silicate, aluminum silicate, sodium aluminum silicate, precipitated silica, silica gel, and fumed silica, precipitated silica being preferred. In addition to the siliceous particles, the filler may include other materials such as, for example, particles of metal oxides, sulfates, and carbonates.

As disclosed in the previously mentioned U.S. Pat. No. 4,927,802, the described microporous materials may be stretched either monoaxially or biaxially, which increases the void volume of the materials and induces regions of molecular orientation. In accordance with the present invention, the receiver sheet substrate comprises a network of interconnecting pores throughout the microporous material that constitutes about 35 to 95 volume percent of the material.

Preferred substrates for the receiver sheet of the invention are microporous polyethylene films, manufactured by PPG Industries, Pittsburgh, Pa., and sold under the tradename Teslin™. These films are available in thicknesses ranging from 7 mils (178 μm) to 14 mils (356 μm) and with densities designated "normal" to "high." Especially preferred receiver sheet substrates are "normal" density Teslin™ films having thicknesses of about 10 mils (254 μm) to 14 mils (356 μm).

The thermoplastic organic polymer layer comprising the image-receiving layer (IRL) of the receiver sheet of the invention provides a smooth toner receptor surface on the IRL that is substantially water-impervious and results in images exhibiting high gloss in D-min and D-max areas as well as in regions of intermediate density. Suitable polymers for the IRL preferably have a glass transition temperature of about 25° C. to 65° C., more preferably, about 40° C. to 60° C.

The polymers comprising the IRL may be homopolymers, copolymers, and blends thereof, including polystyrenes, polyolefins, acrylic and methacrylic polymers, copolymers of styrene and acrylic and/or methacrylic monomers, copolymers of olefin and acrylic and/or methacrylic monomers, polyesters, polyester ionomers, polyamides, polyimides, polyurethanes, polyureas, polycarbonates, polyethers, polysulfides, and hybrids and mixtures thereof. Preferred IRL polymeric materials includes polyester ionomers, copolymers of styrene and acrylic and/or methacrylic monomers, polyurethanes, and hybrids and mixtures thereof.

The IRL, which has a thickness of about 1 μm to 30 μm, preferably about 8 μm to 12 μm, is preferably formed by applying an aqueous dispersion of the polymer to the receiver sheet substrate. Suitable commercially available aqueous-dispersible materials include the Eastman AQ™ polyester ionomers, which are compositions of poly(1,4-cyclohlexylenedimethylene-co-2,2'-oxydiethylene isophthalate-co-5-sodiosulfo-1,3-benzenedicarboxylate). Specific examples of these materials are Eastman AQ™ 55, $T_g$ 55° C.; 38, $T_g$ 38° C.; and 29, $T_g$ 29° C.

Other commercial polymeric aqueous-dispersible compositions are copolymers of 50–70 weight percent styrene and/or α-methylstyrene with 50–30 weight percent acrylic and/or methacrylic alkyl esters, available from J. C. Johnson Co., under the Johncryl™ trade name, for example Johncryl™-52, -89, and -77. Another useful aqueous-dispersible polymer is a styrene-butyl acrylate-2-sulfoethyl methacrylate copolymer, preferably in the monomer weight ratio 60:30:10, obtained from Eastman Kodak Co. Aqueous-dispersible polyurethane-ureas derived from polyoxyethylene alcohols and bis(4-isocyanatocyclohexyl)methane, which are described in U.S. Pat. No. 4,501,852 and are available from Bayer Corporation as Bayhydrol™-110, -121- and -123, are also suitable.

In accordance with the invention, the toner image receiver sheet has a volume resistivity of about $1\times10^8$ ohm-cm to $1\times10^{13}$ ohm-cm, preferably about $1\times10^{10}$ ohm-cm to $1\times10^{12}$ ohm-cm. Volume resistivity within these ranges is necessary to produce the electrostatic bias between the photoconductor element and the image receiver sheet required for efficient, complete transfer of the toner image particles to the sheet. Volume resistivity can be measured by placing a sample of the receiver sheet of known thickness between two electrodes of known area, applying a potential of known voltage to one electrode, and measuring the resulting resistance, using the following formula:

$$P_v=(K_v/t)(R)$$

where $P_v$ is the volume resistivity, $K_v$ is the electrode area, t is the receiver sheet sample thickness, and R is the measured resistance.

The following examples further illustrate the invention:

EXAMPLE 1

Preparation of toner image receiver sheets

A. An IRL coating composition containing 15 weight percent of a blend of 13 weight percent Johncryl™-89, 47 weight percent Johncryl™-77, and 40 weight percent Johncryl™-52, all copolymer compositions of 50–70 weight percent styrene and/or α-methylstyrene with 50–30 weight percent acrylic and/or methacrylic alkyl esters, was prepared in a 60/40 (by volume) water-isopropyl alcohol mixture and designated Composition A.

Composition A was coated at a dry solid laydown of 1.10 g/ft$^2$, producing an IRL with a thickness of 10 μm, on a Teslin™ spid 1400 substrate having a thickness of 14 mils (356 μm), thereby forming receiver sheet A-1 of the invention. Composition A was also coated at the same laydown on two resin-coated papers, manufactured by Eastman Kodak Company and having thicknesses of 4.5 mils (114 μm) and 7 mils (178 μm) to give control receiver sheets A-2 and A-3, respectively.

B. An IRL coating composition containing 15 weight percent of the previously described polyester ionomer composition Eastman AQ™-55 in water containing 0.05 weight percent Olin 10 G surfactant was prepared and designated Composition B.

Composition B was coated at a dry laydown of 1.10 g/ft$^2$, producing a 10 μm- thick IRL, on the Teslin™ and resin-coated paper substrates described in section A above, thereby forming receiver sheet B-1 of the invention and control receiver sheets B-2 and B-3.

C. An IRL coating composition containing 15 weight percent of styrene-butyl acrylate-2-sulfoethyl methacrylate copolymer with a monomer weight ratio of 60:30:10 in water containing 0.05 weight percent Olin 10 G surfactant was prepared and designated Composition C.

Composition C was coated at a dry laydown of 1.10 g/ft$^2$, producing a 10 μm-thick IRL, on the Teslin™ and resin-coated paper substrates described in section A above, thereby forming receiver sheet C-1 of the invention and control receiver sheets C-2 and C-3.

EXAMPLE 2

Evaluation of water-fastness of imaged receiver sheets

To evaluate the receiver sheets of the invention and the controls for water-fastness, 2-in×2-in (5.1-cm×5.1-cm) samples of receiver sheets that had been imaged using an off-line belt fuser set at 250° C. were immersed in water at room temperature for 24 hours, then allowed to air dry for 24 hours. Receiver sheets A-1, B-1, and C-1 showed no toner image cracking or flaking and no substrate distortion, evidence of the water-imperviousness of receiver sheets of the invention. Sheets A-2, A-3, B-2, B-3, C-2, and C-3, on the other hand, all exhibited image cracking and flaking to varying extents, with A-2 and A-3 showing the greatest image damage, B-3 the least among the controls. The test caused at least slight substrate distortion in all of the control sheets, more in A-2, B-2, and C-2 than the others.

Thus, the receiver sheets of the invention showed a substantial water-fastness advantage over the controls. In fact, sheets A-1, B-1, and C-1 of the invention showed no toner image or substrate defects even after an extended period of 72 hours immersion in water.

EXAMPLE 3

Measurement of volume resistivity of receiver sheets and substrates

The volume resistivity values of receiver sheets of the invention were determined using a Keithley Resistance System, Model 6517, from Keithley Co. Calculation of volume resistivities from measured resistance values was carried out according to the equation presented above.

Receiver sheets A-1, B-1, and C-1 of the invention all had volume resistivities in the range $1\times10^{10}$ ohm-cm to $1\times10^{12}$ ohm-cm. The volume resistivity of the Teslin™ spid 1400 substrate was also determined and found to be in the range $1\times10^9$ ohm-cm to $1\times10^{10}$ ohm-cm. A similar determination was also made for a Kodak PET-X™ sheet, which contains polymeric microbeads dispersed in an oriented, heat set thermoplastic polymer, as described in the previously discussed U.S. Pat. No. 5,055,371. This material had a volume resistivity in the range $1\times10^{13}$ ohm-cm to $1\times10^{14}$ ohm-cm, well outside the range required for effective, complete toner particle transfer to the receiver sheet.

EXAMPLE 4

Gloss measurements of imaged receiver sheets

Receiver sheets A-1, B-1, and C-1 of the invention were imaged as described in Example 2, then subjected to gloss measurements using a Gardner Micro TRI gloss meter, model 4520 at a setting of 60 degrees. Measurements were taken in D-max, D-min, and intermediate density regions. A sample of Teslin™ spid 1400 substrate was similarly imaged and subjected to gloss measurements. Results are summarized in TABLE 1.

TABLE 1

| Receiver | IRL Coating | 60 Degree Gloss | | |
|---|---|---|---|---|
| Sheet | Composition | D-max | Intermediate | D-min |
| A-1 | A | 94 | 74 | 72 |
| B-1 | B | 93 | 85 | 76 |
| C-1 | C | 94 | 83 | 53 |
| Teslin ™ | None | 98 | 12 | 13 |

As shown by the data assembled in TABLE 1, high 60 degree gloss values, in the 90's, are obtained in the D-max areas of all the receivers, including the uncoated Teslin™ substrate included as a control. In the intermediate and minimum density regions, however, the uncoated Teslin™ exhibits very low gloss. Imaged receiver sheets A-1, C-1, and especially B-1, on the other hand, are characterized by high gloss in the D-min and intermediate density areas.

The invention has been described in detail with particular reference to preferred embodiments thereof, but it will be understood that variations and modifications can be effected within the spirit and scope of the invention.

What is claimed is:

1. A toner image receiver sheet for electrophotography, said receiver sheet comprising:

a substantially opaque substrate of microporous material that comprises:

a matrix of substantially water-insoluble organic polymer containing dispersed, finely divided, substantially water-insoluble filler particles, said filler particles being at least 50 weight percent siliceous particles and constituting about 40 to 90 weight percent of said microporous material; a network of interconnecting pores communicating substantially throughout said microporous material, said pores constituting about 35 to 95 volume percent of said microporous material; and disposed on at least one surface of said substrate, a substantially water-impervious toner image-receiving layer comprising a thermoplastic organic polymer;

wherein said toner image receiver sheet is substantially impervious to water and has a volume resistivity of about $1\times10^{8}$ ohm-cm to $1\times10^{13}$ ohm-cm.

2. The receiver sheet of claim 1 wherein said volume resistivity is about $1\times10^{10}$ ohm-cm to $1\times10^{12}$ ohm-cm.

3. The receiver sheet of claim 1 wherein the matrix polymer of said substrate is selected from the group consisting of a polyolefin, a polyhaloolefin, a polyester, a polyamide, a polyimide, a polyurethane, a polyurea, a polystyrene, an acrylic polymer, a methacrylic polymer, a polycarbonate, a polyether, a polysulfide, a polysilane, a polysiloxane, and hybrids and mixtures thereof.

4. The receiver sheet of claim 3 wherein the substrate matrix polymer is a polyolefin.

5. The receiver sheet of claim 4 wherein said substrate matrix polymer is a polyethylene or a polypropylene.

6. The receiver sheet of claim 1 wherein said siliceous particles are selected from the group consisting of calcium silicate, aluminum silicate, sodium aluminum silicate, precipitated silica, silica gel, fumed silica particles, and mixtures thereof.

7. The receiver sheet of claim 6 wherein said siliceous particles are precipitated silica particles.

8. The receiver sheet of claim 1 wherein said substrate has a thickness of about 178 μm (7 mils) to 356 μm (14 mils).

9. The receiver sheet of claim 8 wherein the substrate thickness is about 254 μm (10 mils) to 356 μm (14 mils).

10. The receiver sheet of claim 1 wherein the thermoplastic organic polymer of said image-receiving layer is selected from the group consisting of a polystyrene, a polyolefin, an acrylic polymer, a methacrylic polymer, a copolymer of styrene and acrylic and/or methacrylic monomers, a copolymer of olefin and acrylic and/or methacrylic monomers, a polyester, a polyester ionomer, a polyamide, a polyimide, a polyurethane, a polyurea, a polycarbonate, a polyether, a polysulfide, and hybrids and mixtures thereof.

11. The receiver sheet of claim 10 wherein said thermoplastic organic polymer is selected from the group consisting of a polyester ionomer, a copolymer of styrene and acrylic and/or methacrylic monomers, a polyurethane, a polyurea, and hybrids and mixtures thereof.

12. The receiver sheet of claim 11 wherein said polyesterionomer is a poly(1,4-cyclohexylenedimethylene-co-2,2'-oxydiethylene isophthalate-co-sodiosulfo-1,3-benzenedicarboxylate)polymer.

13. The receiver sheet of claim 11 wherein said copolymer of styrene and acrylic and/or methacrylic monomers is a copolymer of about 50–70 weight percent of a styrene and/or α-methylstyrene monomer with about 50–30 weight percent of an acrylic and/or methacrylic alkyl ester.

14. The receiver sheet of claim 11 wherein said copolymer of styrene and acrylic and/or methacrylic monomers is a styrene-butyl acrylate-2-sulfoethyl methacrylate copolymer.

15. The receiver sheet of claim 11 wherein said polyurethane is a derivative of a polyoxyethylene alcohol and bis(4-isocyanatocyclohexyl)methane.

16. The receiver sheet of claim 10 wherein said thermoplastic organic polymer in the image-receiving layer has a glass transition temperature of about 25° C. to 65° C.

17. The receiver sheet of claim 16 wherein the image-receiving layer polymer has a glass transition temperature of about 40° C. to 60° C.

18. The receiver sheet of claim 1 wherein said image-receiving layer has a thickness of about 1 μm to 30 μm.

19. The receiver sheet of claim 18 wherein the image-receiving layer thickness is about 8 μm to 12 μm.

20. The receiver sheet of claim 1 providing a 60 degree gloss value of at least about 50 in an image D-min area.

21. The receiver sheet of claim 21 providing a 60 degree gloss value of at least about 70 in an image D-min area.

22. A process for forming a toner image receiver sheet for electrophotography, said process comprising:

providing a substantially opaque substrate of microporous material that comprises:

a matrix of substantially water-insoluble organic polymer containing dispersed, finely divided, substantially water-insoluble filler particles, said filler particles being distributed throughout said matrix, said particles being at least 50 weight percent siliceous particles and constituting about 40 to 90 weight percent of said microporous material; a network of interconnecting pores communicating substantially throughout said microporous material, said pores constituting about 35 to 95 volume percent of said microporous material; and applying to at least one surface of said substrate a composition comprising a thermoplastic organic polymer, thereby forming a substantially water-insoluble toner image-receiving layer;

wherein said toner image receiver sheet is substantially impervious to water and has a volume resistivity of about $1\times10^{8}$ ohm-cm to $1\times10^{13}$ ohm-cm.

23. The process of claim 22 wherein said volume resistivity is about $1\times10^{10}$ ohm-cm to $1\times10^{12}$ ohm-cm.

24. The process of claim 22 wherein the matrix of said substrate comprises a polyolefin.

25. The process of claim 22 wherein the siliceous particles included in said substrate comprise silica.

26. The process of claim 22 wherein the thermoplastic organic polymer forming the toner image-receiving layer is selected from the group consisting of a polyester ionomer, a copolymer of styrene and acrylic and/or methacrylic polymers, a polyurethane, a polyurea, and hybrids and mixtures thereof.

27. The process of claim 26 wherein the composition comprising the thermoplastic organic polymer for forming the toner image-receiving layer is an aqueous composition.

28. The process of claim 26 wherein the thermoplastic organic polymer forming the toner image-receiving layer has a glass transition temperature of about 25° C. to 65° C.

29. The process of claim 22 wherein said substrate has a thickness of about 178 $\mu$m to 356 $\mu$m and said image-receiving layer has a thickness of about 1 $\mu$m to 30 $\mu$m.

* * * * *